(12) United States Patent
Takahashi et al.

(10) Patent No.: US 9,097,201 B2
(45) Date of Patent: Aug. 4, 2015

(54) MOTORCYCLE

(75) Inventors: Seigo Takahashi, Shizuoka (JP); Hidetoshi Ishigami, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 447 days.

(21) Appl. No.: 13/812,191

(22) PCT Filed: Mar. 24, 2011

(86) PCT No.: PCT/JP2011/001731
§ 371 (c)(1),
(2), (4) Date: Jan. 25, 2013

(87) PCT Pub. No.: WO2012/077248
PCT Pub. Date: Jun. 14, 2012

(65) Prior Publication Data
US 2013/0191009 A1    Jul. 25, 2013

(30) Foreign Application Priority Data

Dec. 6, 2010    (JP) ................ 2010-271454

(51) Int. Cl.
*F02D 41/30*    (2006.01)
*B62J 37/00*    (2006.01)
(Continued)

(52) U.S. Cl.
CPC ......... *F02D 41/30* (2013.01); *B62J 37/00* (2013.01); *B62K 11/00* (2013.01); *F02M 31/125* (2013.01); *F02M 37/007* (2013.01); *F02M 37/0082* (2013.01); *Y02T 10/126* (2013.01)

(58) Field of Classification Search
CPC ........ F01B 1/10; F01L 13/0042; F01L 1/146; F01L 2001/0537; B62K 2207/00; B62K 2207/02; B62K 2207/04; B62J 35/00; B62J 37/00; F02M 31/125; F02M 37/0082
USPC .......................................... 123/557; 701/104
See application file for complete search history.

(56) References Cited

U.S. PATENT DOCUMENTS 4,820,215 A *  4/1989  Mizusawa et al. .......... 440/88 R
8,060,294 B2 * 11/2011  Matsumoto .................. 701/109
(Continued)

FOREIGN PATENT DOCUMENTS

EP    1 619 066 A1    1/2006
EP    2 249 009 A1    11/2010
(Continued)

OTHER PUBLICATIONS

Official Communication issued in International Patent Application No. PCT/JP2011/001731, mailed on Jun. 21, 2011.
(Continued)

*Primary Examiner* — Hai Huynh
*Assistant Examiner* — Gonzalo Laguarda
(74) *Attorney, Agent, or Firm* — Keating & Bennett, LLP

(57) ABSTRACT

A motorcycle includes a CPU (Central Processing Unit) of an ECU (Electronic Control Unit) that drives a fuel heating device when a fuel heating condition is satisfied and the result of a fuel heating prohibition determination process indicates that heating is permitted. On the other hand, the CPU does not drive the fuel heating device when the fuel heating condition is not satisfied or when the result of the fuel heating prohibition determination process indicates that heating is prohibited. In the fuel heating prohibition determination process, the CPU determines a tilted state of the motorcycle, and prohibits or permits heating of fuel in a fuel pipe by the fuel heating device based on a detection result of the tilted state.

6 Claims, 11 Drawing Sheets

(51) Int. Cl.
  *F02M 31/125* (2006.01)
  *F02M 37/00* (2006.01)
  *B62K 11/00* (2006.01)

(56) References Cited

U.S. PATENT DOCUMENTS

| | | |
|---|---|---|
| 2007/0178343 A1 | 8/2007 | Muramatsu |
| 2008/0066721 A1* | 3/2008 | Friedman ................ 123/557 |
| 2008/0156558 A1 | 7/2008 | Otsubo et al. |
| 2009/0143960 A1 | 6/2009 | Matsumoto |
| 2009/0166115 A1 | 7/2009 | Mizutani et al. |
| 2009/0198436 A1 | 8/2009 | Sasaki |
| 2012/0227389 A1* | 9/2012 | Hinderks ................. 60/317 |

FOREIGN PATENT DOCUMENTS

| | | |
|---|---|---|
| JP | 2003-20976 A | 1/2003 |
| JP | 2007-200874 A | 8/2007 |
| JP | 2008-30544 A | 2/2008 |
| JP | 2008-162512 A | 7/2008 |
| JP | 2008-274825 A | 11/2008 |
| JP | 2009-150381 A | 7/2009 |
| JP | 2009-241922 A | 10/2009 |
| JP | 2010-235076 A | 10/2010 |
| JP | 2010-265774 A | 11/2010 |

OTHER PUBLICATIONS

Official Communication issued in corresponding European Patent Application No. 11846636.6, mailed on Feb. 25, 2015.

* cited by examiner

F I G. 9
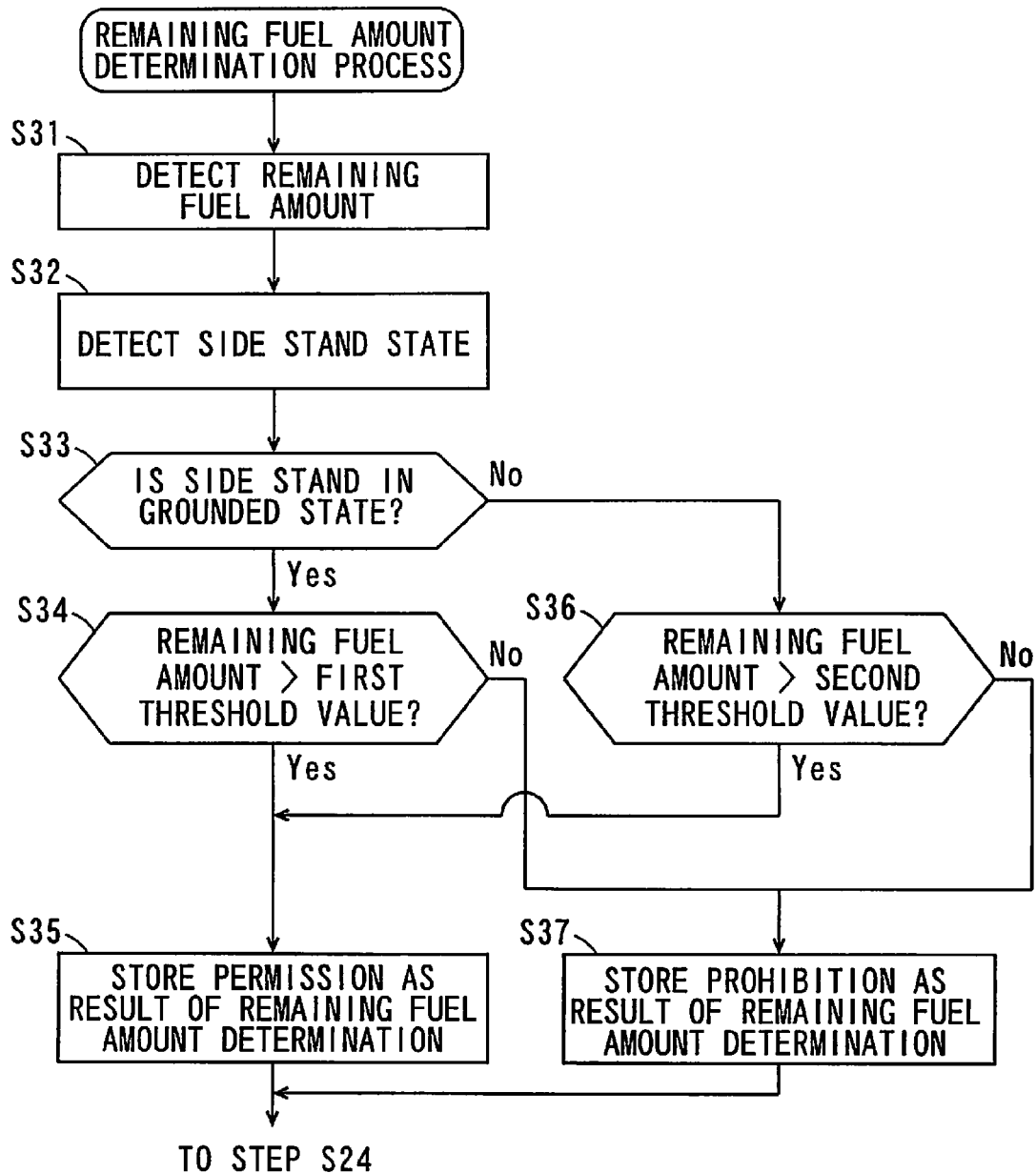

though a fuel pipe, a fuel heating device that
MOTORCYCLE

BACKGROUND OF THE INVENTION

1. Field of the Invention

The present invention relates to a motorcycle in which fuel can be heated at engine start-up.

2. Description of the Related Art

Recently, vehicles with engines that are capable of using a blended fuel of gasoline and alcohol have been developed. Because the alcohol in the blended fuel is less likely to evaporate compared to the gasoline, the higher the concentration of the alcohol in the fuel is, the more deteriorated the starting characteristics of the engine are. In particular, the starting characteristics of the engine are more likely to deteriorate when the environmental temperature is low.

Therefore, a starting device that improves the starting characteristics at low temperature by heating the fuel in a fuel pipe at start-up has been disclosed. (See, for example, JP 2008-274825 A).

In the starting device described in JP 2008-274825 A, the fuel in the fuel pipe is heated by a heater. On the basis of the temperature of cooling water and the standing time from engine stop to engine re-start, the degree of heating the fuel by the heater is determined. This prevents the fuel from being overheated at start-up.

However, in motorcycles, an insufficient amount of fuel in the fuel pipes may occur under a variety of situations that are different from four-wheel motor vehicles. If the heater operates without enough fuel in the fuel pipe, the fuel in the fuel pipe is overheated. In this case, a required amount of the fuel for start-up is unlikely to be supplied due to vapor generated in the fuel pipe. Further, the controllability of the temperature of the fuel deteriorates since the temperature of the fuel rises above a required temperature.

SUMMARY OF THE INVENTION

Preferred embodiments of the present invention provide a motorcycle in which overheating of the fuel can be prevented and starting characteristics of an engine can be improved.

According to a preferred embodiment of the present invention, a motorcycle includes a main body that supports a front wheel and a rear wheel, an engine provided on the main body, a fuel injection device provided at the engine, a fuel tank provided on the main body, a fuel pump including an inlet port in the fuel tank and that supplies fuel in the fuel tank to the fuel injection device through a fuel pipe, a fuel heating device that heats the fuel in the fuel pipe, a tilt detector that detects a tilt of the main body, and a controller arranged and programmed to control the fuel heating device and to determine a first state in which a sufficient amount of the fuel is present at the inlet port of the fuel pump and a second state in which an insufficient amount of the fuel is present at the inlet port of the fuel pump based on the detection result of the tilt detector, wherein the controller prohibits an operation of the fuel heating device when the second state is detected.

In the present preferred embodiment of the motorcycle, the fuel in the fuel tank is sucked from the inlet port in the fuel tank by the fuel pump and supplied to the fuel injection device through the fuel pipe. The fuel in the fuel pipe is heated by the fuel heating device. This causes the starting characteristics of the engine to be improved.

Because of the tilt of the main body, the amount of fuel at the inlet port of the fuel pump may become insufficient. In this case, air may be mixed with the fuel in the fuel pipe and the amount of fuel in the fuel pipe is reduced. In the present preferred embodiment of the motorcycle, the tilt detector detects the tilt of the main body. On the basis of the detection result of the tilt detector, the controller determines the first state in which a sufficient amount of the fuel is present at the inlet port of the fuel pump and the second state in which an insufficient amount of the fuel is present at the inlet port of the fuel pump. When the second state is determined, the operation of the fuel heating device is prohibited by the controller. Thus, the fuel in the fuel pipe is not heated.

As a result, it is possible to prevent overheating of the fuel and improve the starting characteristics of the engine.

In a preferred embodiment of the present invention, the controller may determine, when a shift from the second state to the first state is detected, whether or not a predetermined amount of fuel has been injected from the fuel injection device after the shift to the first state, and may prohibit the operation of the fuel heating device until the predetermined amount of fuel is injected.

In the second state, the amount of fuel at the inlet port of the fuel pump is insufficient. When the motorcycle shifts from the second state to the first state, air may be taken into the fuel pipe from the inlet port. In this case, injecting the predetermined amount of fuel from the fuel injection device can exhaust air in the fuel pipe. Therefore, the operation of the fuel heating device is prohibited until the predetermined amount of fuel is injected from the fuel injection device after the shift to the first state. This reliably prevents the fuel in the fuel pipe from being overheated.

The motorcycle may further include a side stand that supports the main body on the ground surface in a state in which the main body is tilted, a side stand state detector that detects whether the side stand is in the grounded state or in the ungrounded state, and a remaining fuel amount detector that detects the remaining fuel amount in the fuel tank, wherein the controller may determine as the second state a case in which the grounded state is detected by the side stand state detector and the remaining fuel amount detected by the remaining fuel amount detector is not larger than a predetermined first threshold value, or may determine as the second state a case in which the ungrounded state is detected by the side stand state detector and the remaining fuel amount detected by the remaining fuel amount detector is not larger than a predetermined second threshold value.

When the side stand is in the grounded state, the fuel tank is tilted together with the main body. Therefore, the state as to whether the amount of fuel is present or insufficient at the inlet port of the fuel pump differs depending on whether the side stand is in the grounded state or the side stand is in the ungrounded state. Accordingly, when the side stand is in the grounded state, the case in which the remaining fuel amount in the fuel tank is not larger than the first threshold value is determined as the second state, and when the side stand is in the ungrounded state, the case in which the remaining fuel amount in the fuel tank is not larger than the second threshold value is determined as the second state. This accurately determines whether a sufficient or insufficient amount of fuel is present at the inlet port of the fuel pump depending on whether the side stand is in the grounded state or in the ungrounded state. As a result, the fuel in the fuel pipe is reliably prevented from being overheated.

The motorcycle may further include a fall detector that detects a falling over of the motorcycle, wherein the controller may determine as the second state a case in which the falling over of the motorcycle is detected by the fall detector.

When the motorcycle falls over, the amount of fuel at the inlet port of the fuel pump may be insufficient since the fuel tank is lying sideways. Therefore, the case in which the falling over of the motorcycle is detected as the second state. Thus, when the motorcycle has fallen over, the fuel in the fuel pipe is reliably prevented from being overheated.

The motorcycle may further include an ambient temperature detector that detects an ambient temperature of the fuel injected from the fuel injection device, wherein the controller prohibits the operation of the fuel heating device when the temperature detected by the ambient temperature detector is not lower than a predetermined temperature, and permits the operation of the fuel heating device when the temperature detected by the ambient temperature detector is lower than the predetermined temperature and the first state is detected.

In this case, when the ambient temperature of the fuel injected from the fuel injection device is not lower than the predetermined temperature, the fuel in the fuel pipe is not heated. Further, when the ambient temperature of the fuel injected from the fuel injection device is lower than the predetermined temperature and the fuel is present at the inlet port of the fuel pump, the fuel in the fuel pipe is heated. Thus, the fuel can reliably be prevented from being overheated and the starting characteristics of the engine can be improved.

The ambient temperature detector may detect as the ambient temperature at least one of a temperature of the engine and a temperature of the air that is taken into the engine.

In this case, when the temperature of the engine or the temperature of the air taken into the engine is not lower than the predetermined temperature, the fuel in the fuel pipe is not heated. This can prevent the temperature of the fuel injected into the engine from being excessively increased.

According to the preferred embodiments of the present invention, it is possible to prevent overheating of the fuel and improve the starting characteristics of the engine.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a flowchart showing a control operation of a fuel heating device by an ECU after a main switch is turned on.

FIG. 9 is a flowchart showing a remaining fuel amount determination process of FIG. 8.

DETAILED DESCRIPTION OF THE PREFERRED EMBODIMENTS

Figure 1:
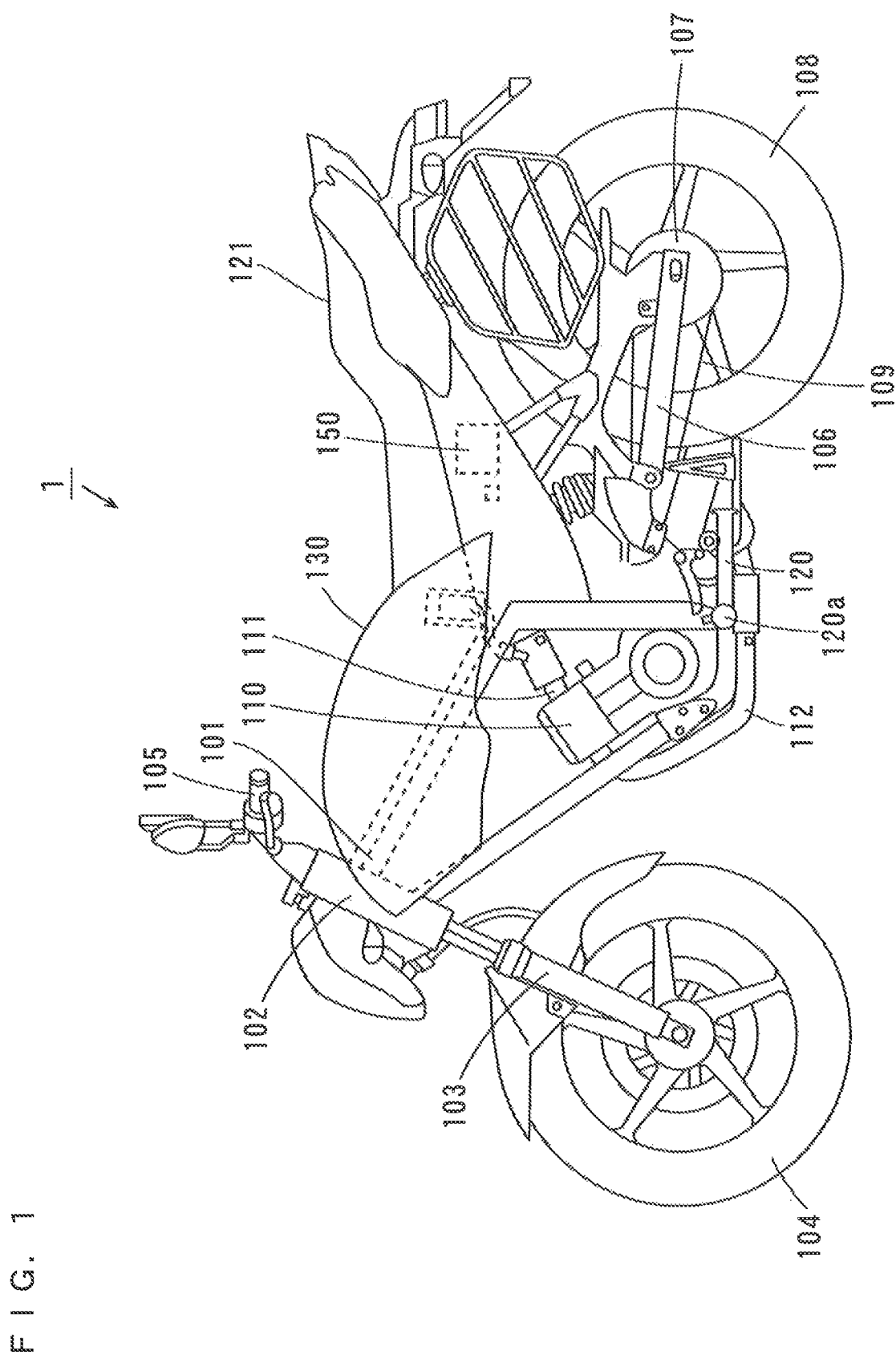
FIG. 1 is a schematic side view showing a motorcycle according to a preferred embodiment of the present invention.
Figure 2:
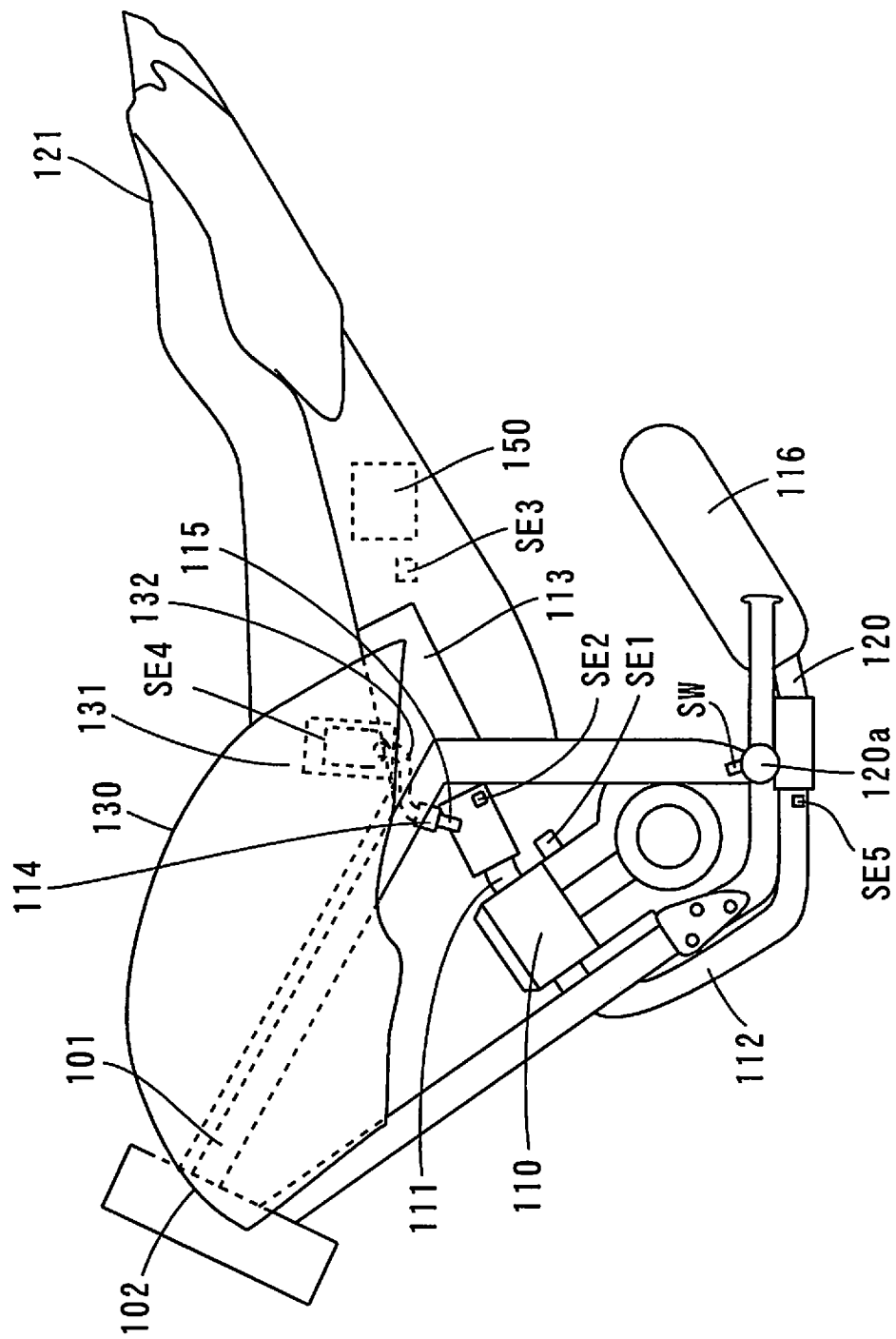
FIG. 2 is an enlarged view of a portion of the motorcycle of FIG. 1.

FIG. 1 is a schematic side view showing a motorcycle according to the present preferred embodiment. FIG. 2 is an enlarged view of a portion of the motorcycle of FIG. 1.

In the motorcycle 1 of FIG. 1, a head pipe 102 is provided at the front end of a main frame 101. A front fork 103 is attached to the head pipe 102. In this state, the front fork 103 is rotatable within a predetermined angular range with the axis of the head pipe 102 as its center. A front wheel 104 is rotatably supported at the lower end of the front fork 103. A handle 105 is provided at the upper end of the head pipe 102.

A rear arm 106 is connected to the main frame 101 to extend backward from the main frame 101. The rear arm 106 holds a rear wheel driven sprocket 107 and a rear wheel 108 to be rotatable. A chain 109 is attached to the rear wheel driven sprocket 107.

An engine 110 is provided at the center of the main frame 101. An intake pipe 111 and an exhaust pipe 112 are attached respectively to an intake port and an exhaust port of the engine 110.

One end of a side stand 120, centered on a shaft 120a, is rotatably attached to the lower end of the main frame 101. The side stand 120 is adjusted by the driver to be in a substantially horizontal state where its front end is spaced away from the ground surface (hereinafter referred to as an ungrounded state) or a substantially vertical state where the front end is in contact with the ground surface (hereinafter referred to as a grounded state). The motorcycle 1 is tilted toward the ground surface when the side stand 120 is in the grounded state.

A fuel tank 130 is provided above the engine 110, and a seat 121 is provided behind the fuel tank 130.

As shown in FIG. 2, an air cleaner 113 is provided upstream of the intake pipe 111. Further, a fuel injection device 115 is attached to the intake pipe 111. A fuel pump 131 is provided in the fuel tank 130. The fuel pump 131 is connected to the fuel injection device 115 through a fuel pipe 132 and a fuel heating device 114. The fuel heating device 114 is capable of heating the fuel in the fuel pipe 132. A muffler 116 is attached to the downstream end of the exhaust pipe 112.

An ECU (Electronic Control Unit) 150 is preferably provided at a lower portion of the seat 121.

An engine temperature sensor SE1 that detects the temperature of the engine 110 is attached to the side surface of the engine 110. An intake-air temperature sensor SE2 that detects the temperature of air taken into the engine 110 is attached to the intake pipe 111. A fall sensor SE3 that detects whether or not the motorcycle 1 has fallen over is attached to the seat 121. A remaining fuel amount sensor SE4 that detects the remaining fuel amount in the fuel tank 130 is attached in the fuel tank 130. An oxygen sensor SE5 that detects the concentration of oxygen in the gas exhausted from the engine 110 is attached to the exhaust pipe 112. A side stand switch SW is attached to the shaft 120a of the side stand 120. The side stand switch SW is turned on and off depending on the grounded state or the ungrounded state of the side stand 120.

Hereinafter, the plane passing through the center of the main frame 101, the head pipe 102, the front wheel 104, and the rear wheel 108 of the motorcycle 1 will be called a symmetry plane. The motorcycle 1 is in a vertical state when the symmetry plane of the motorcycle 1 is parallel to the direction of gravity, and the motorcycle 1 is in a tilted state when the symmetry plane of the motorcycle 1 is not parallel to the direction of gravity.

It is assumed that the motorcycle 1 is in the vertical state when the side stand 120 is in the ungrounded state, and the motorcycle 1 is in the tilted state when the side stand 120 is in the grounded state.

Figure 3:
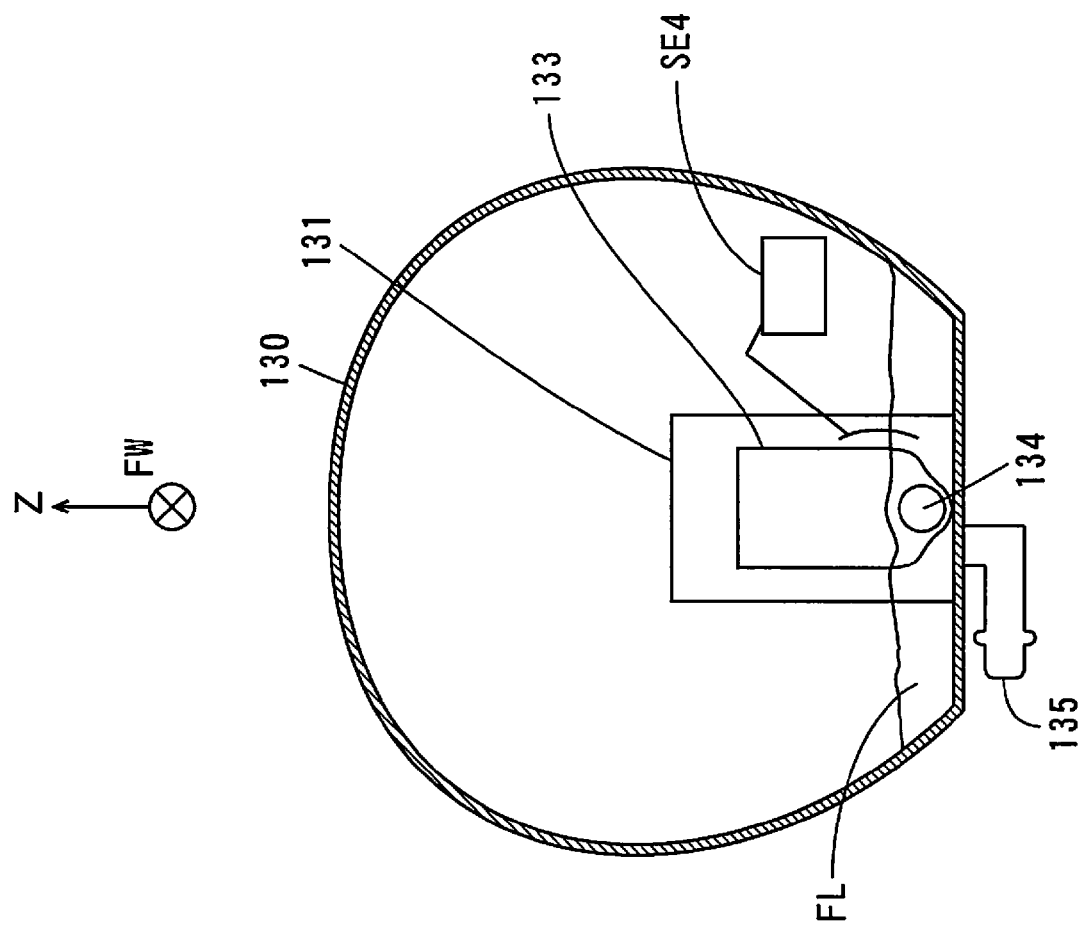
FIG. 3 is a vertical cross-sectional view showing the internal configuration of a fuel tank.
Figure 4:
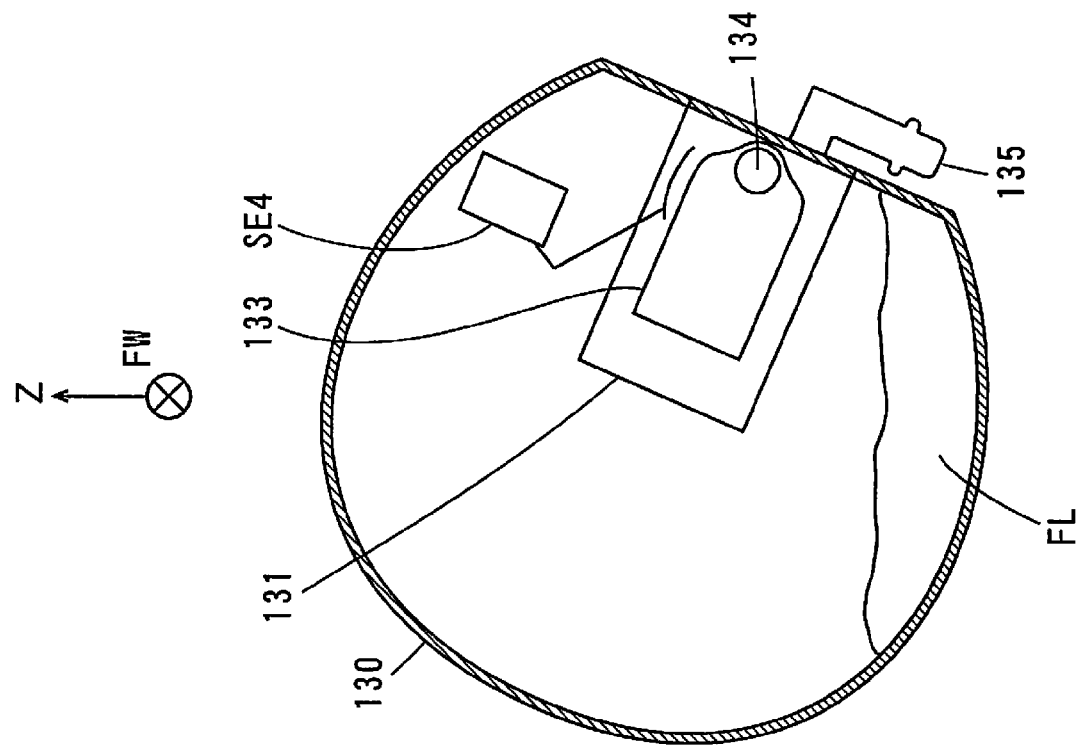
FIG. 4 is a vertical cross-sectional view showing the internal configuration of the fuel tank.
Figure 5:
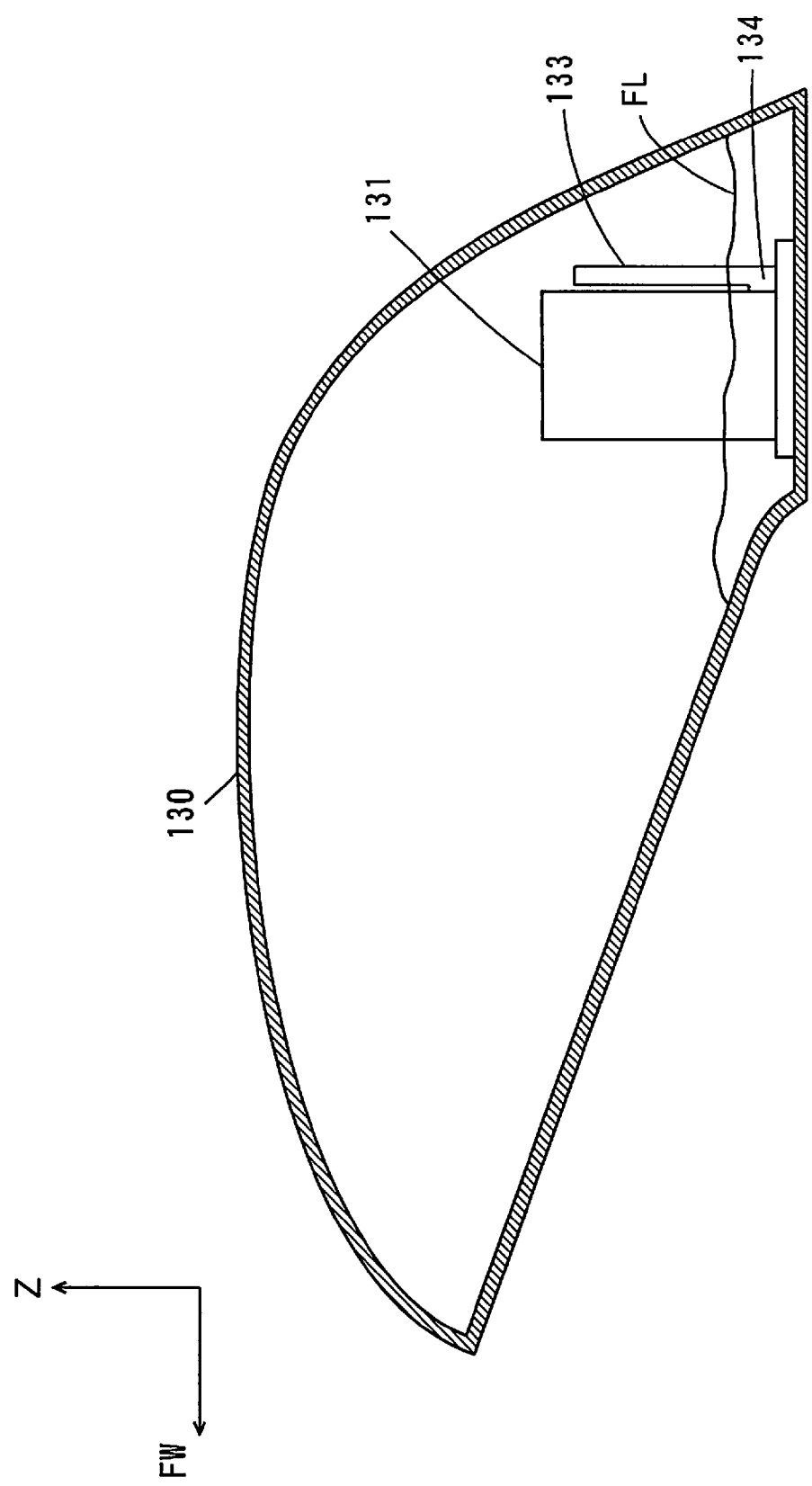
FIG. 5 is a vertical cross-sectional view showing the internal configuration of the fuel tank.

FIGS. 3, 4, and 5 are cross-sectional views illustrating the internal configuration of the fuel tank 130. FIGS. 3 and 4 show vertical cross-sections of the motorcycle 1 that are perpendicular to the front and rear direction of the motorcycle 1, and FIG. 5 shows a vertical cross-section of the motorcycle 1 that is parallel to the front and rear direction of the motorcycle 1. Further, FIG. 3 shows the internal state of the fuel tank 130 when the motorcycle 1 is in the vertical state, and FIG. 4 shows the internal state of the fuel tank 130 when the motorcycle 1 has fallen over. In FIGS. 3 to 5, the arrow FW denotes the front and rear direction of the motorcycle 1, and the arrow Z denotes the direction parallel to the direction of gravity.

As shown in FIGS. 3 and 4, the fuel pump 131, a fuel filter 133 and the remaining fuel amount sensor SE4 are provided in the fuel tank 130. Fuel FL is filled in the fuel tank 130. In the present preferred embodiment, a blended fuel of gasoline and alcohol is preferably used for the fuel FL, for example.

As shown in FIGS. 3 and 5, an inlet port 134 of the fuel pump 131 is arranged at the lower portion of the fuel tank 130. As shown in FIGS. 3 and 4, the fuel pipe 132 in FIG. 2 is attached to a discharge port 135 of the fuel pump 131. The fuel FL is sucked into the fuel pump 131 from the inlet port 134 through the fuel filter 133. The fuel pump 131 supplies the fuel FL from the discharge port 135 through the fuel pipe 132 shown in FIG. 2 to the fuel injection device 115.

The remaining fuel amount sensor SE4 includes a float and detects the liquid level of the fuel FL in the fuel tank 130 as the remaining fuel amount.

As shown in FIG. 3, when the motorcycle 1 is in the vertical state, the fuel FL at the bottom of the fuel tank 130 is sucked into the fuel pump 131 from the inlet port 134. On the other hand, as shown in FIG. 4, when the motorcycle 1 has fallen over, the fuel FL at the bottom of the fuel tank 130 cannot be sucked into the fuel pump 131 from the inlet port 134. In this case, air is taken into the fuel pump 131 from the inlet port 134, and the air is mixed with the fuel in the fuel pipe 132 and the fuel injection device 115. When the fuel heating device 114 is operated in this condition, the fuel in the fuel pipe 132 may be overheated due to the reduced amount of the fuel in the fuel pipe 132.

In addition, when the side stand 120 is in the grounded state and there is a smaller amount of the fuel FL in the fuel tank 130, the fuel FL at the bottom of the fuel tank 130 cannot be sucked into the fuel pump 131 from the inlet port 134. Further, when the side stand 120 is in the ungrounded state, the motorcycle 1 is in the vertical state, and the amount of the fuel FL in the fuel tank 130 is even smaller, the fuel FL at the bottom of the fuel tank 130 cannot be sucked into the fuel pump 131 from the inlet port 134. In these cases also, air is taken into the fuel pump 131 from the inlet port 134 and the air is mixed with the fuel in the fuel pipe 132 and the fuel injection device 115 similarly to when the motorcycle 1 has fallen over.

Figure 6:
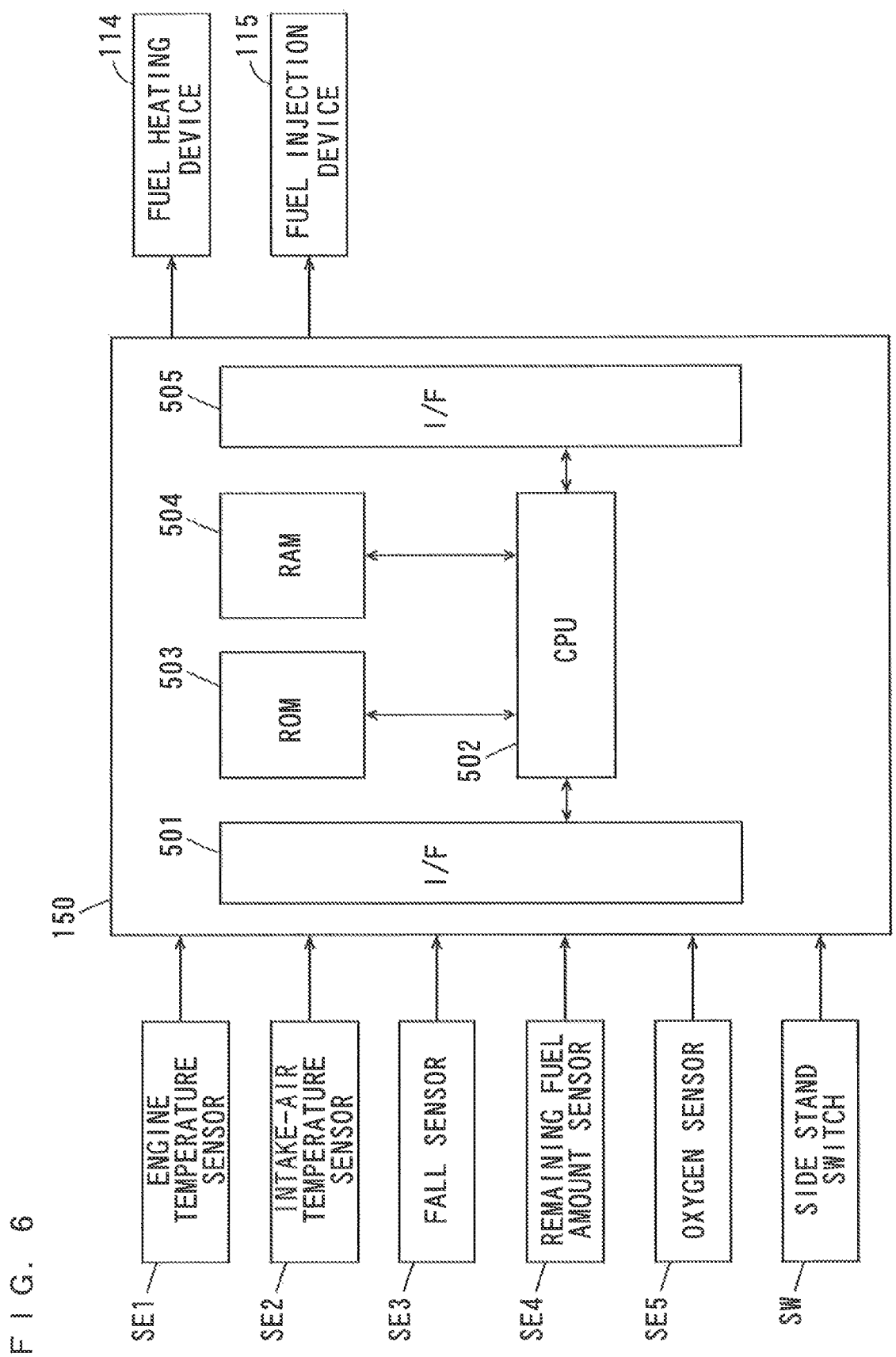
FIG. 6 is a block diagram showing the configuration of a control system of the motorcycle of FIG. 1.

FIG. 6 is a block diagram showing the configuration of the control system of the motorcycle 1 of FIG. 1. As shown in FIG. 6, the ECU 150 includes I/F (Interfaces) 501, 505, a CPU (Central Processing Unit) 502, a ROM (Read-Only Memory) 503, and a RAM (Random Access Memory) 504.

The detected values of the engine temperature sensor SE1, the intake-air temperature sensor SE2, the fall sensor SE3, the remaining fuel amount sensor SE4, and the oxygen sensor SE5, and the state of the side stand switch SW are provided to the CPU 502 through the I/F 501 of the ECU 150.

In the ROM 503 of the ECU 150, a program to perform a control operation, described below, is stored. The CPU 502 performs the control operation by executing the control operation program stored in the ROM 503 on the RAM 504. This causes the CPU 502 to control the fuel heating device 114 based on the detected values of the engine temperature sensor SE1, the intake-air temperature sensor SE2, the fall sensor SE3, the remaining fuel amount sensor SE4, and the state of the side stand switch SW. Further, the CPU 502 controls the fuel injection device 115 based on the detected value of the oxygen sensor SE5 such that an air fuel ratio of an air-fuel mixture in the engine 110 is a theoretical air fuel ratio.

Figure 7:
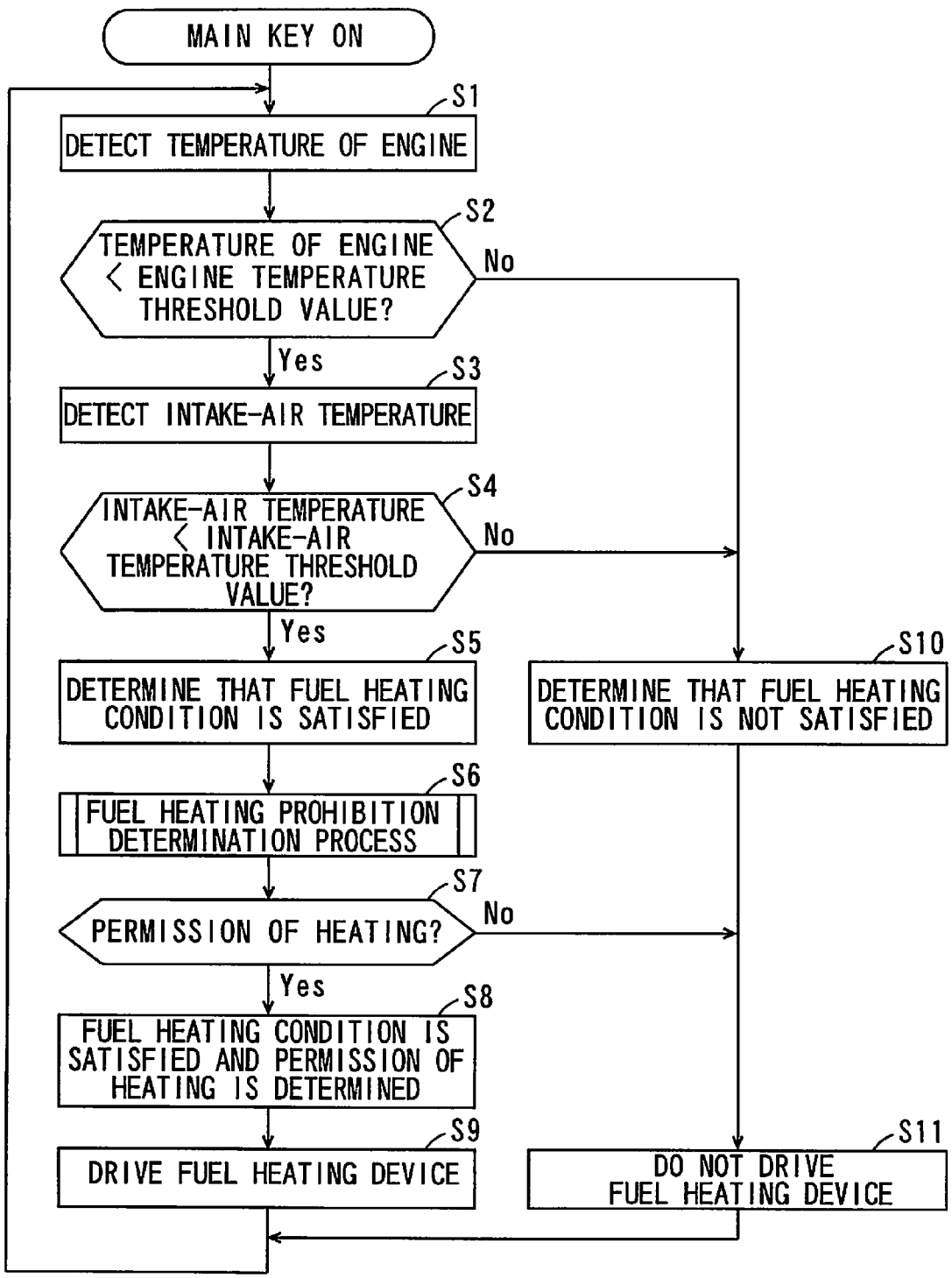

FIG. 7 is a flowchart showing a control operation of the fuel heating device 114 by the ECU 150 after a main switch is turned on.

In the following process, the CPU 502 of the ECU 150 determines whether or not to drive the fuel heating device 114 after a driver turns on the main switch, and drives or does not drive the fuel heating device 114 based on the result of the determination. Meanwhile, the driver turns on a starter switch at an arbitrary time after turning on the main switch. The fuel injection device 115 starts to inject the fuel when the starter switch is turned on.

In the RAM 504 of the ECU 150, an engine temperature threshold value and an intake-air temperature threshold value are previously stored.

After the main switch is turned on, the CPU 502 determines the temperature of the engine 110 by obtaining the detected value of the engine temperature sensor SE1 (step S1). Then, the CPU 502 determines whether or not the detected temperature of the engine 110 is lower than the engine temperature threshold value stored in the RAM 504 (step S2).

When the detected temperature of the engine 110 is lower than the engine temperature threshold value, the CPU 502 determines the intake-air temperature by obtaining the detected value of the intake-air temperature sensor SE2 (step S3). Then, the CPU 502 determines whether or not the detected intake-air temperature is lower than the intake-air temperature threshold value stored in the RAM 504 (step S4).

When the detected intake-air temperature is lower than the intake-air temperature threshold value, the CPU 502 determines that a fuel heating condition is satisfied (step S5). In this case, the CPU 502 executes a fuel heating prohibition determination process (step S6). Details regarding the fuel heating prohibition determination process will be described below. The result of the fuel heating prohibition determination process is stored in the RAM 504.

Thereafter, the CPU 502 determines whether or not the result of the fuel heating prohibition determination process stored in the RAM 504 indicates permission of heating (step S7). If the result of the fuel heating prohibition determination process indicates permission of heating, the CPU 502 determines that the fuel heating condition is satisfied and heating is permitted (step S8). In this case, the CPU 502 drives the fuel heating device 114 (step S9). Thereafter, the CPU 502 returns to the process of step S1.

On the other hand, when the detected temperature of the engine 110 in step S2 is not lower than the engine temperature threshold value, and when the detected intake-air temperature in step S4 is not lower than the intake-air temperature threshold value, the CPU 502 determines that the fuel heating condition is not satisfied (step S10). In this case, the CPU 502 does not drive the fuel heating device 114 (step S11) and returns to the process of step S1.

Further, when the result of the fuel heating prohibition determination process indicates prohibition of heating in step S7, the CPU 502 does not drive the fuel heating device 114 (step S11), and returns to the process of step S1.

As described above, the fuel heating condition is satisfied when the temperature of the engine 110 is lower than the engine temperature threshold value and the intake-air temperature is lower than the intake-air temperature threshold value, otherwise the fuel heating condition is not satisfied. The fuel heating device 114 operates when the fuel heating condition is satisfied, and the result of the fuel heating prohibition determination process indicates permission of heating. As a result, the fuel FL in the fuel pipe 132 is heated.

On the other hand, when the fuel heating condition is not satisfied, or the result of the fuel heating prohibition determination process indicates prohibition of heating, the fuel heating device 114 does not operate. As a result, the fuel FL in the fuel pipe 132 is not heated.

Figure 8:
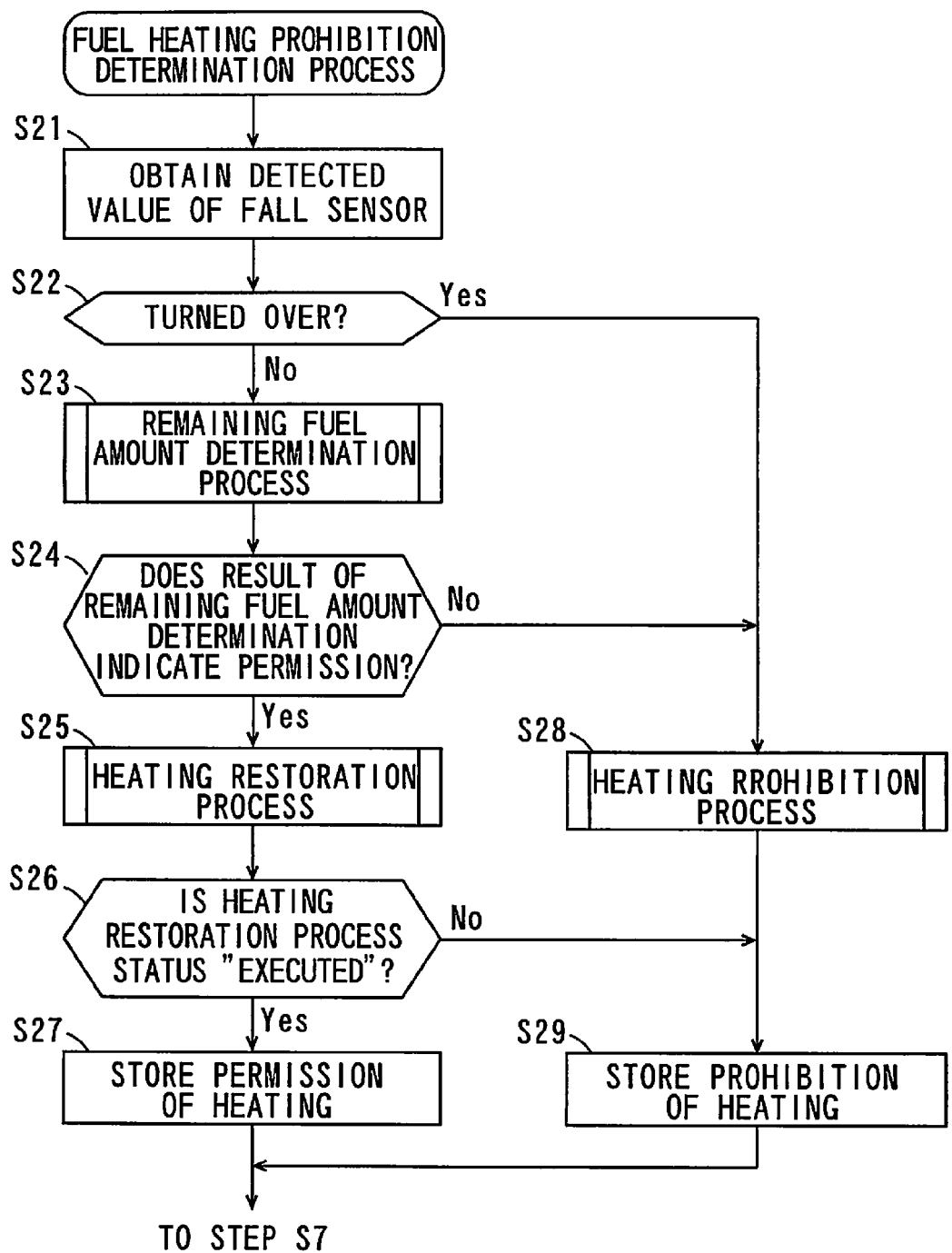
FIG. 8 is a flowchart showing a fuel heating prohibition determination process of FIG. 7.

FIG. 8 is a flowchart showing the fuel heating prohibition determination process of FIG. 7.

The CPU 502 obtains the detected value of the fall sensor SE3 (step S21). The CPU 502 determines whether or not the motorcycle 1 has fallen over based on the detected value of the fall sensor SE3 (step S22).

When the motorcycle 1 has not fallen over, the CPU 502 executes a remaining fuel amount determination process (step S23). In the remaining fuel amount determination process, "permitted" or "prohibited" is stored in the RAM 504 as the result of the remaining fuel amount determination. When the remaining amount of the fuel FL in the fuel tank 130 is not larger than a predetermined value, the result of the remaining fuel amount determination is "prohibited." On the other hand, when the remaining amount of the fuel FL in the fuel tank 130 is larger than the predetermined value, the result of the remaining fuel amount determination is "permitted." Details regarding the remaining fuel amount determination process will be described below.

Thereafter, the CPU 502 determines whether or not the result of the remaining fuel amount determination stored in the RAM 504 is "permitted" (step S24). When the result of the remaining fuel amount determination is "permitted", the CPU 502 executes a heating restoration process (step S25). In the heating restoration process, "executed" or "in execution" is stored in the RAM 504 as a heating restoration process status. When the result of the fuel heating prohibition determination process (steps S27 and S28) restores from prohibition of heating to permission of heating, a certain amount of the fuel is injected from the fuel injection device 115. The heating restoration process status becomes "in execution" during the injection of the certain amount of the fuel, and the heating restoration process status becomes "executed" after the injection of the certain amount of the fuel is completed. Details regarding the heating restoration process will be described below.

Thereafter, the CPU 502 determines whether or not the heating restoration process status stored in the RAM 504 is "executed" (step S26). When the heating restoration process status stored in the RAM 504 is "executed", the CPU 502 stores permission of heating in the RAM 504 as the result of the fuel heating prohibition determination process (step S27), and proceeds to the process of step S7 of FIG. 7.

When the motorcycle 1 has fallen over in step S22 and when the result of the remaining fuel amount determination in step S24 is "prohibited", the CPU 502 executes a heating prohibition process (step S28). In the heating prohibition process, "in execution" is stored in the RAM 504 as the heating restoration process status. Details regarding the heating prohibition process will be described below.

Thereafter, the CPU 502 stores "prohibited" in the RAM 504 as the result of the fuel heating prohibition determination process (Step S29), and proceeds to the process of step S7 of FIG. 7.

When the heating restoration process status is "in execution" in step S26, the CPU 502 stores "prohibited" in the RAM 504 as the result of the fuel heating prohibition determination process (step S29) and proceeds to the process of step S7 of FIG. 7.

FIG. 9 is a flowchart showing the remaining fuel amount determination process of FIG. 8. First and second threshold values, described below, are previously stored in the ROM 503 or the RAM 504.

First, the CPU 502 determines the remaining fuel amount in the fuel tank 130 by obtaining the detected value of the remaining fuel amount sensor SE4 (step S31). Then, the CPU 502 determines the state of the side stand 120 by obtaining the state of the side stand switch SW (step S32), and determines whether or not the side stand 120 is in the grounded state (step S33).

When the side stand 120 is in the grounded state, the CPU 502 determines whether or not the detected remaining fuel amount is larger than the first threshold value (step S34). The first threshold value is previously stored in the ROM 503 or the RAM 504.

When the remaining fuel amount is larger than the first threshold value, the CPU 502 stores "permitted" in the RAM 504 as the result of the remaining fuel amount determination (step S35). On the other hand, when the remaining fuel amount is not larger than the first threshold value, the CPU 502 stores "prohibited" in the RAM 504 as the result of the remaining fuel amount determination (step S37).

When the side stand 120 is in the ungrounded state in step S33, the CPU 502 determines whether or not the detected remaining fuel amount is larger than the second threshold value (step S36).

When the remaining fuel amount is larger than the second threshold value, the CPU 502 stores "permitted" in the RAM 504 as the result of the remaining fuel amount determination (step S35). On the other hand, when the remaining fuel amount is not larger than the first threshold value, the CPU 502 stores "prohibited" in the RAM 504 as the result of the remaining fuel amount determination (step S37).

The above-mentioned first threshold value is, by a certain amount of margin, larger than the detected value of the remaining fuel amount sensor SE4 when the side stand 120 is in the grounded state and the liquid level of the fuel FL in the fuel tank 130 is at the upper end of the inlet port 134.

The above-mentioned second threshold value is, by a certain amount of margin, larger than the detected value of the remaining fuel amount sensor SE4 when the side stand 120 is in the ungrounded state, the motorcycle 1 is in the vertical state, and the liquid level of the fuel FL in the fuel tank 130 is at the upper end of the inlet port 134.

Thus, by setting the first and the second threshold values, it is determined whether or not the liquid level of the fuel FL in the fuel tank 130 is higher than the inlet port 134 regardless of whether the motorcycle 1 is in the vertical state or in the tilted state. As a result, it is determined whether or not air may be mixed with the fuel in the fuel pipe 132 or the fuel injection device 115.

Figure 10:
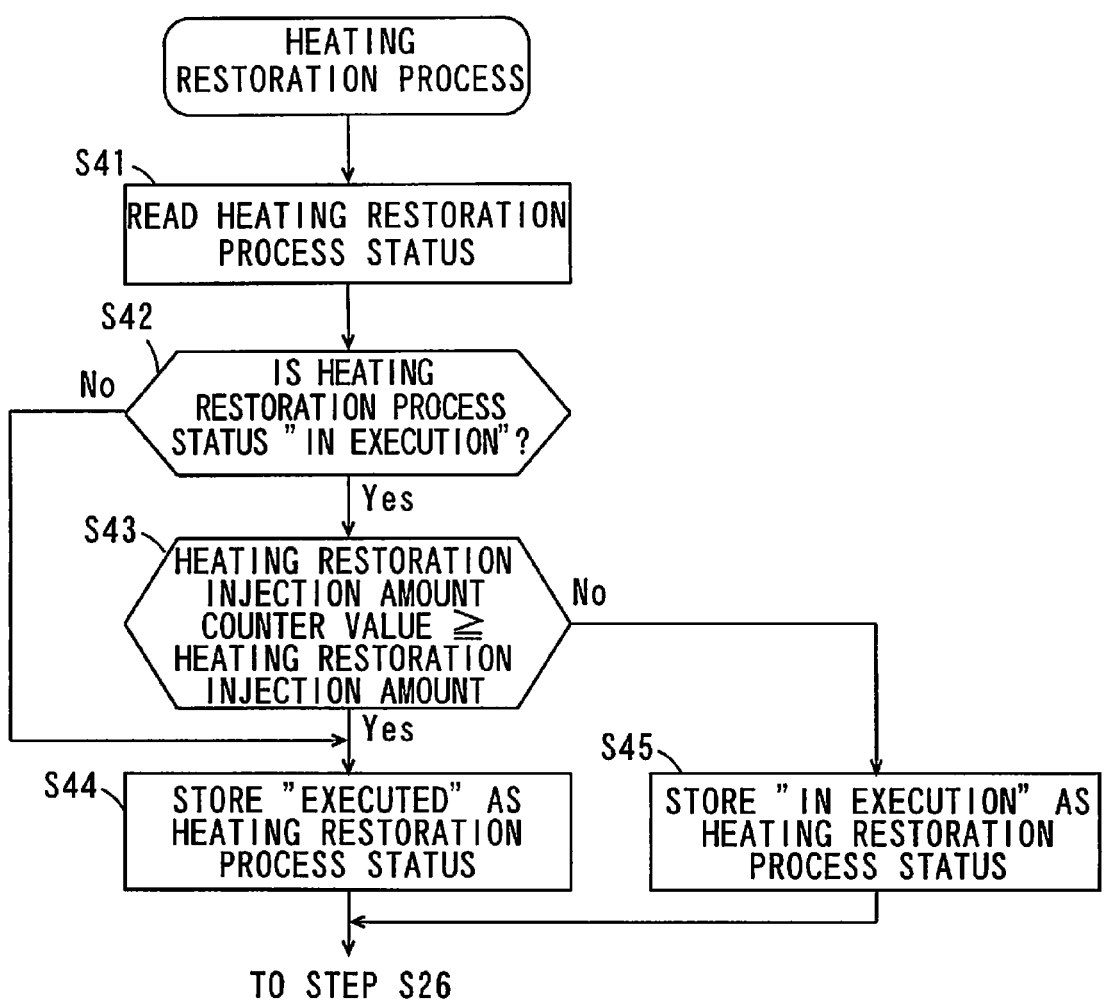
FIG. 10 is a flowchart showing a heating restoration process of FIG. 8.

FIG. 10 is a flowchart showing the heating restoration process of FIG. 8. A heating restoration injection amount counter value is stored in the RAM 504. The CPU 502 clears the heating restoration injection amount counter value, and then accumulates the amount of the fuel injected by the fuel injection device 115 and stores the accumulation result as a counted heating restoration injection amount counter value. Further, a heating restoration injection amount, described below, is previously stored in the ROM 503 or the RAM 504.

First, the CPU 502 reads the heating restoration process status from the RAM 504 (step S41) and determines whether or not the read heating restoration process status is "in execution" (step S42).

When the heating restoration process status is "in execution", it determines whether or not the heating restoration injection amount counter value is not smaller than the heating restoration injection amount (step S43).

The heating restoration injection amount is the fuel injection amount required to exhaust the air mixed with the fuel in the fuel pipe 132 and the fuel heating device 114 from the fuel injection device 115.

When the heating restoration injection amount counter value is not smaller than the heating restoration injection amount, the CPU 502 stores "executed" in the RAM 504 as the heating restoration process status (step S44), and proceeds to step S26 of FIG. 8. On the other hand, when the heating restoration injection amount counter value is smaller than the heating restoration injection amount, the CPU 502 stores "in execution" in the RAM 504 as the heating restoration process status (step S45), and proceeds to step S26 of FIG. 8.

When the heating restoration process status is "executed" in step S42, the CPU 502 stores "executed" in the RAM 504 as the heating restoration process status (step S44), and proceeds to step S26 of FIG. 8.

Figure 11:
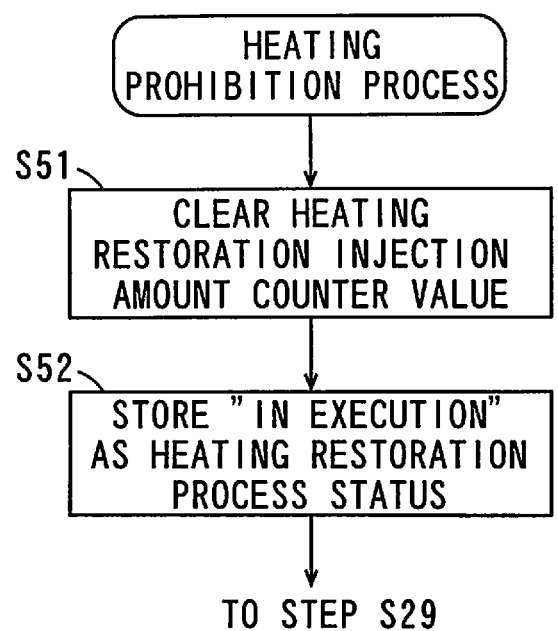
FIG. 11 is a flowchart showing a heating prohibition process of FIG. 8.

FIG. 11 is a flowchart showing the heating prohibition process of FIG. 8. The CPU 502 clears the heating restoration injection amount counter value stored in the RAM 504 (step S51). As described above, the CPU 502 clears the heating restoration injection amount counter value, and then accumulates the amount of the fuel injected from the fuel injection device 115 and stores the accumulation result in the RAM 504 as the counted heating restoration injection amount counter value. Then, the CPU 502 stores "in execution" in the RAM 504 as the heating restoration process status (step S52), and proceeds to the process of step S29 of FIG. 8.

According to the motorcycle 1 of the above-described preferred embodiment of the present invention, when the fuel heating condition is satisfied and the result of the fuel heating prohibition determination process indicates permission of heating, the fuel in the fuel pipe 132 is heated by the fuel heating device 114. As a result, the starting characteristics of the engine 110 are improved.

Further, in the case in which the motorcycle 1 has fallen over, the result of the fuel heating prohibition determination process becomes prohibition of heating. As a result, the fuel heating device 114 does not operate, and thus, the fuel in the fuel pipe 132 is not heated.

Further, in the case in which the motorcycle 1 has not fallen over, when the side stand 120 is in the grounded state and the remaining fuel amount in the fuel tank 130 is not larger than the first threshold value, the result of the remaining fuel amount determination is "prohibited", while when the side stand 120 is in the ungrounded state and the remaining fuel amount in the fuel tank 130 is not larger than the second threshold value, the result of the remaining fuel amount determination is "prohibited." Therefore, the result of the fuel heating prohibition determination process becomes prohibition of heating and the fuel heating device 114 does not operate. Thus, the fuel in the fuel pipe 132 is not heated. In this case, the presence or the insufficiency of the amount of fuel at the inlet port 134 of the fuel pump 131 is accurately determined according to the grounded state or the ungrounded state of the side stand 120.

Furthermore, when the motorcycle 1 is stood up and the side stand 120 is in the grounded state after falling, and the remaining fuel amount in the fuel tank 130 is larger than the first threshold value, the result of the remaining fuel amount determination restores from "prohibited" to "permitted." Further, when the motorcycle 1 is stood up to be in the vertical state after falling, and the remaining fuel amount in the fuel tank 130 is larger than the second threshold value, the result of the remaining fuel amount determination also restores from "prohibited" to "permitted." Furthermore, when the side stand 120 is in the grounded state and the remaining fuel amount in the fuel tank 130 is not larger than the first threshold value, and then the side stand 120 becomes ungrounded and the remaining fuel amount in the fuel tank 130 becomes larger than the second threshold value, the result of the remaining fuel amount determination also restores from "prohibited" to "permitted." In these cases, the result of the fuel heating prohibition determination process indicates prohibition of heating until the fuel of the heating restoration injection amount is injected from the fuel injection device 115. As a result, the fuel with air mixed therein in the fuel pipe 132 can be prevented from being heated by the fuel heating device 114.

Further, when the temperature of the engine 110 is not lower than the engine temperature threshold value, or the intake-air temperature is not lower than the intake-air temperature threshold value, the fuel heating condition is not satisfied. As a result, the temperature of the fuel injected into the engine 110 can be prevented from rising excessively.

Consequently, the starting characteristics of the engine 110 can be improved and the fuel in the fuel pipe 132 can reliably be prevented from being overheated.

While the tilt of the motorcycle 1 is detected preferably based on whether or not the motorcycle 1 has fallen over and the state of the side stand 120 in the above-described preferred embodiments, the present invention is not limited to this. For example, the tilt of the motorcycle 1 may be detected only based on whether or not the motorcycle 1 has fallen over, and the tilt of the motorcycle 1 may also be detected only based on the state of the side stand 120.

Further, the tilt of the motorcycle 1 may be detected by other detectors such as an acceleration sensor, and the fuel heating device 114 may be controlled based on the detection result from the acceleration sensor.

Furthermore, while the fuel heating device 114 is controlled based on the fuel heating condition and the result of the fuel heating prohibition determination process in the above-described preferred embodiments, the present invention is not limited to this. The fuel heating device 114 may be controlled based on the result of the fuel heating prohibition determination process without determination of the fuel heating condition.

Further, while the fuel heating condition is determined based on the temperature of the engine 110 and the intake-air temperature in the above-described preferred embodiments, the present invention is not limited to this. For example, the fuel heating condition may be determined based on another temperature such as the exhaust air temperature.

In the following paragraphs, non-limiting examples of correspondence between various elements recited in the claims below and those described above with respect to various preferred embodiments of the present invention are explained.

In the preferred embodiments described above, the main frame 101 is an example of a main body, the engine 110 is an example of an engine, the fuel injection device 115 is an example of a fuel injection device, the fuel tank 130 is an example of a fuel tank, the inlet port 134 is an example of an inlet port, the fuel pump 131 is an example of a fuel pump, the side stand 120 or the fall sensor SE3 is an example of a tilt detector, and the ECU 150 is an example of a controller.

Furthermore, the heating restoration injection amount is an example of a predetermined amount, the side stand 120 is an example of a side stand, the side stand switch SW is an example of a side stand state detector, the remaining fuel amount sensor SE4 is an example of a remaining fuel amount detector, the fall sensor SE3 is an example of a fall detector, the engine temperature sensor SE1 or the intake-air temperature sensor SE2 is an example of an ambient temperature detector, and the temperature of the engine 110 or the intake-air temperature is an example of an ambient temperature of the fuel injected by the fuel injection device.

As the elements recited in the claims, a variety of other elements having the configuration or function recited in the claims may be used as well.

Various preferred embodiments of the present invention are applicable to a motorcycle with a function of heating fuel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motorcycle comprising:
a main body that supports a front wheel and a rear wheel;
an engine provided on the main body;
a fuel injection device provided at the engine;
a fuel tank provided on the main body;
a fuel pump including an inlet port in the fuel tank and that supplies fuel in the fuel tank to the fuel injection device through a fuel pipe;
a fuel heating device that heats the fuel in the fuel pipe;
a tilt detector that detects a tilt of the main body; and
a controller arranged and programmed to control the fuel heating device and to determine a first state in which a sufficient amount of the fuel is present at the inlet port of the fuel pump, and a second state in which an insufficient amount of the fuel is present at the inlet port of the fuel pump based on a detection result of the tilt detector; wherein
the controller prohibits an operation of the fuel heating device when the second state is determined by the controller.

2. The motorcycle according to claim 1, wherein the controller is programmed to determine, when a shift from the second state to the first state is detected, whether or not a predetermined amount of fuel is injected from the fuel heating device after the shift to the first state, and to prohibit the operation of the fuel heating device until the predetermined amount of fuel is injected.

3. The motorcycle according to claim 1, further comprising:
a side stand that supports the main body on a ground surface in a state in which the main body is tilted;
a side stand state detector that detects whether the side stand is in a grounded state or in an ungrounded state; and
a remaining fuel amount detector that detects a remaining fuel amount in the fuel tank; wherein
the controller determines as the second state a case in which the grounded state is detected by the side stand state detector and the remaining fuel amount detected by the remaining fuel amount detector is not larger than a predetermined first threshold value, or determines as the second state a case in which the ungrounded state is detected by the side stand state detector and the remaining fuel amount detected by the remaining fuel amount detector is not larger than a predetermined second threshold value.

4. The motorcycle according to claim 1, further comprising a fall detector that detects if the motorcycle has fallen over; wherein
the controller determines as the second state a case in which the falling over of the motorcycle is detected by the fall detector.

5. The motorcycle according to claim 1, further comprising an ambient temperature detector that detects an ambient temperature of the fuel injected from the fuel injection device; wherein
the controller prohibits the operation of the fuel heating device when the temperature detected by the ambient temperature detector is not lower than a predetermined temperature, and permits the operation of the fuel heating device when the temperature detected by the ambient temperature detector is lower than the predetermined temperature and the first state is determined.

6. The motorcycle according to claim 5, wherein the ambient temperature detector detects as the ambient temperature at least one of a temperature of the engine and a temperature of air taken into the engine.

* * * * *